(12) United States Patent
Tong

(10) Patent No.: US 9,884,951 B2
(45) Date of Patent: Feb. 6, 2018

(54) REDUCING POLYMER FOULING AND AGGLOMERATION IN ACRYLATE/METHACRYLATE PROCESSES

(71) Applicant: Ecolab USA Inc., St. Paul, MN (US)

(72) Inventor: David Youdong Tong, Houston, TX (US)

(73) Assignee: Ecolab USA Inc., St. Paul, MN (US)

(*) Notice: Subject to any disclaimer, the term of this patent is extended or adjusted under 35 U.S.C. 154(b) by 23 days.

(21) Appl. No.: 14/881,880

(22) Filed: Oct. 13, 2015

(65) Prior Publication Data
US 2016/0102189 A1    Apr. 14, 2016

Related U.S. Application Data

(60) Provisional application No. 62/063,697, filed on Oct. 14, 2014.

(51) Int. Cl.
C08K 5/12      (2006.01)
C08F 2/00      (2006.01)

(52) U.S. Cl.
CPC ............... C08K 5/12 (2013.01); C08F 2/005 (2013.01)

(58) Field of Classification Search
CPC ............ C08K 5/12; C07C 67/22; C07C 69/54
See application file for complete search history.

(56) References Cited

U.S. PATENT DOCUMENTS

| | | | |
|---|---|---|---|
| 2,455,745 A | 12/1948 | Erickson | |
| 2,783,271 A * | 2/1957 | Eck | C07C 67/22 203/100 |
| 2,810,651 A | 10/1957 | Thompson | |
| 2,965,685 A | 12/1960 | Campbell | |
| 3,222,334 A | 12/1965 | Demme | |
| 3,320,305 A | 5/1967 | Wiese | |
| 3,696,050 A | 10/1972 | Werts, III et al. | |
| 3,704,235 A | 11/1972 | Rassat et al. | |
| 4,202,742 A | 5/1980 | Castle | |

(Continued)

FOREIGN PATENT DOCUMENTS

| | | |
|---|---|---|
| CA | 2232502 | 9/1998 |
| CA | 2 260 310 A1 | 7/2000 |

(Continued)

OTHER PUBLICATIONS

International Search Report and Written Opinion issued for PCT/US2015/055359, dated Jan. 18, 2016, 12 pages.

(Continued)

Primary Examiner — Lanee Reuther
(74) Attorney, Agent, or Firm — Senniger Powers LLP

(57) ABSTRACT

The present invention generally relates to a method for reducing polymer agglomeration or fouling, and its use in processes for the preparation of an acrylate, methacrylic acid, or a methacrylate. According to the present invention, the reagent comprises an alkyl phthalate, an alkaryl phthalate, an aryl phthalate, or a phthalic acid, and applying the reagent to processes for the preparation of an acrylate, methacrylic acid, or a methacrylate to prevent polymeric foulant precursors from agglomerating or to dissolve existing polymeric agglomerates or foulants so as to reduce polymer agglomeration or fouling in the process or storage equipment.

19 Claims, 1 Drawing Sheet

(56) References Cited

U.S. PATENT DOCUMENTS

| | | | |
|---|---|---|---|
| 4,293,347 A * | 10/1981 | Haschke | C09D 9/005 134/11 |
| 4,487,981 A | 12/1984 | Miller et al. | |
| 5,221,498 A | 6/1993 | Reid et al. | |
| 5,235,056 A | 8/1993 | Cunkle et al. | |
| 5,290,888 A | 3/1994 | Gatechair et al. | |
| 5,426,257 A | 6/1995 | Arhancet | |
| 5,489,720 A | 2/1996 | Arhancet | |
| 5,648,574 A | 7/1997 | Arhancet et al. | |
| 5,670,692 A | 9/1997 | Nesvadba et al. | |
| 5,728,305 A | 3/1998 | Hawkinson | |
| 5,728,872 A | 3/1998 | Riemenschneider | |
| 5,750,765 A | 5/1998 | Nesvadba et al. | |
| 5,773,674 A | 6/1998 | Arhancet et al. | |
| 5,932,735 A | 8/1999 | Cunkle et al. | |
| 6,180,231 B1 | 1/2001 | Keogh | |
| 6,284,936 B2 | 9/2001 | Shahid | |
| 6,342,647 B1 | 1/2002 | Roof et al. | |
| 6,500,982 B1 | 12/2002 | Hale et al. | |
| 6,525,146 B1 | 2/2003 | Shahid | |
| 6,599,326 B1 | 7/2003 | Seltzer et al. | |
| 6,686,422 B2 | 2/2004 | Shahid | |
| 6,770,222 B1 | 8/2004 | Ukita et al. | |
| 7,066,990 B2 | 6/2006 | Wood et al. | |
| 7,132,540 B1 | 11/2006 | Jawdosiuk et al. | |
| 7,282,136 B2 | 10/2007 | Howdeshell | |
| 7,309,682 B2 | 12/2007 | Lupia et al. | |
| 7,429,545 B2 | 9/2008 | Lupia et al. | |
| 7,618,644 B2 | 11/2009 | Lupia et al. | |
| 7,718,096 B2 | 5/2010 | Yale et al. | |
| 7,943,809 B2 | 5/2011 | Benage et al. | |
| 8,110,650 B2 | 2/2012 | Nava et al. | |
| 8,247,593 B2 | 8/2012 | Morrison et al. | |
| 8,691,944 B2 | 4/2014 | Clark et al. | |
| 8,884,038 B2 | 11/2014 | Masere | |
| 2009/0287013 A1 | 11/2009 | Morrison et al. | |
| 2010/0168434 A1 | 7/2010 | Loyns et al. | |
| 2012/0056128 A1 | 3/2012 | Thoret Bauchet | |
| 2012/0313036 A1 | 12/2012 | Masere | |
| 2013/0178652 A1 | 7/2013 | Fruchey et al. | |
| 2014/0288337 A1 | 9/2014 | Rinker et al. | |

FOREIGN PATENT DOCUMENTS

| | | |
|---|---|---|
| CN | 102795966 A | 11/2012 |
| DE | 102008061611 A1 | 6/2009 |
| EP | 0 373 636 A1 | 6/1990 |
| EP | 0 765 856 A1 | 4/1997 |
| EP | 0 915 108 A1 | 5/1999 |
| EP | 0 943 665 A1 | 9/1999 |
| WO | 01/12677 A1 | 2/2001 |
| WO | 01/40404 A1 | 6/2001 |
| WO | 2006/078123 A1 | 7/2006 |
| WO | 2007/045886 A1 | 4/2007 |
| WO | 2008/103613 A2 | 8/2008 |
| WO | 2015/084843 A1 | 6/2015 |

OTHER PUBLICATIONS

Jurd, Leonard et al., New Types of Insect Chemosterilants, Benzylphenols and Benzl-1,3-benzodioxole Derivatives as Additives to Housefly Diet, Journal of Agricultural and Food Chemistry, 1979, pp. 1007-1016, vol. 27, No. 5.

King, Frank D., Bioisosteres, Conformational Restriction, and Prodrugs—Case History: An Example of a Conformational Restriction Approach, Med. Chem., Principle and Practice (1994), pp. 206-208.

Ma, Yun, Nitroxides in Mechanistic Studies; Ageing of Gold Nanoparticles and Nitroxide Transformation in Acids, Submitted to the Department of Chemistry, University of York, 2010, 221 pages.

Miyazawa, Takeo et al., New Method for Preparation of Superoxide Ion by Use of Amino Oxide, J. Org. Chem., Dec. 1985, vol. 50, No. 25, pp. 5389-5391.

Sciannamea, Valerie et al., In-Situ Nitroxide-Mediated Radical Polymerization (NMP) Processes: Their Understanding and Optimization, Chem. Rev. 2008, vol. 108, No. 3, pp. 1104-1126.

Synthesis of Tropine & Its Derivatives, accessed from http://www.lab-q.net/synthesis/syn-tropine on Dec. 18, 2014, 6 pages.

* cited by examiner

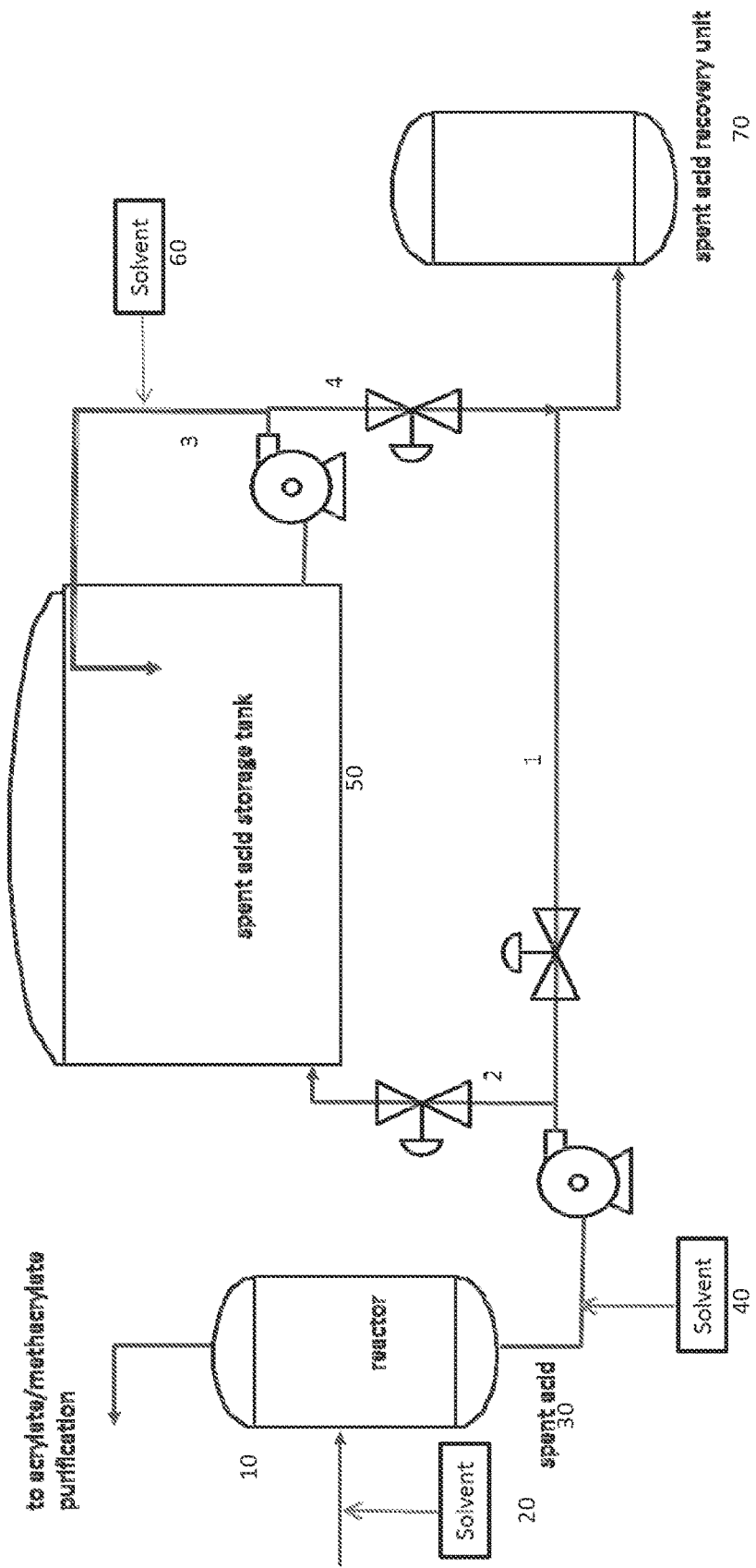

REDUCING POLYMER FOULING AND AGGLOMERATION IN ACRYLATE/METHACRYLATE PROCESSES

This application claims the benefit of U.S. Provisional Patent Application Ser. No. 62/063,697, filed Oct. 14, 2014, the entirety of which is incorporated herein by reference.

FIELD OF THE INVENTION

The present invention generally relates to a method for reducing polymer fouling or agglomeration, and its use in an acrylate, methacrylic acid, or a methacrylate process. According to the present invention, the reagent comprises an alkyl phthalate, an alkaryl phthalate, an aryl phthalate, or a phthalic acid, and applying the reagent to an acrylate, methacrylic acid, or a methacrylate process to prevent polymeric foulant precursors from agglomerating or to dissolve existing polymeric agglomerates and/or foulants to reduce polymer agglomeration or fouling in the process or storage equipment.

BACKGROUND OF THE INVENTION

In the acetone cyanohydrin-methyl methacrylate (ACH-MMA) process, acetone cyanohydrin is added to an excess of sulfuric acid (1.4-1.8 mol/mol ACH), which acts as both reactant and solvent. The reaction between ACH and sulfuric acid produces α-sulfatoisobutyramide, which then undergoes an elimination reaction under the heated process conditions to give methacrylamide sulfate.

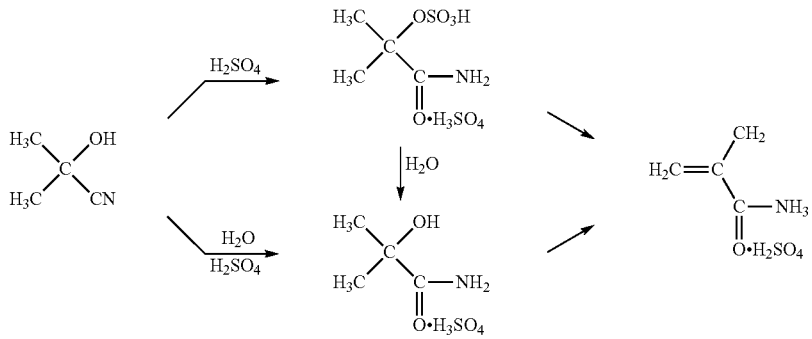

In the next stage, sulfuric acid serves as catalyst in a combined hydrolysis/esterification of the methacrylamide sulfate to a mixture of MMA and methylacrylic acid (MAA).

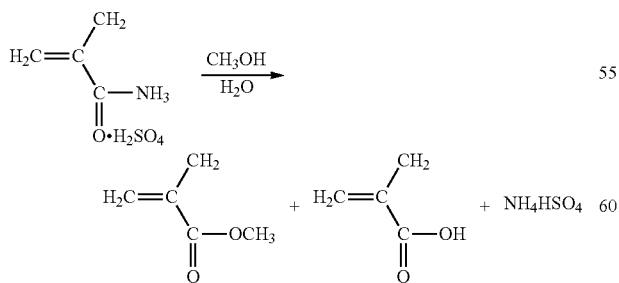

In one scheme, the methacrylamide sulfate is reacted with aqueous methanol in a continuous reactor or a series of reactors at temperatures of from 100 to 150° C.

In the industrial process for the manufacture of methyl methacrylate (MMA), an aqueous sulfuric acid waste stream (spent acid) is produced. This spent acid stream is concentrated with sulfuric acid ($H_2SO_4$), ammonium bisulfate ($NH_4.HSO_4$) and residual organic components. The organic components generally comprise a high proportion of residues and tars and smaller quantities of lighter organic compounds.

Due to the highly contaminated nature of MMA spent acid, the current industrial treatment method available for acid recovery and concentration is that involving regeneration. In this process, the spent acid is decomposed in a brick-lined furnace at about 1000° C. At this temperature, the organic components in the spent acid are oxidized to carbon dioxide and water, the ammonium salts are converted to nitrogen and sulfur dioxide; and the sulfuric acid is reduced to sulfur dioxide. The sulfur dioxide gas stream produced in the regeneration process passes through heat recovery and gas cleaning processes before being converted to sulfuric acid in a conventional contact acid plant.

Polymerization of MMA, MAA, methacrylamide or other vinyl monomers is undesirable and very common in the manufacturing processes for preparing an acrylate, methacrylic acid, or a methacrylate monomer. In the MMA manufacturing process, polymers formed from MMA, MAA, and other vinyl monomers flow out of the process with the spent acid. Many of the polymers formed have a lower density than the spent acid, so they float in the aqueous acid and when they agglomerate, precipitate out of the spent acid, or deposit on the equipment, they can cause process operating problems.

Polymer formation, agglomeration, and fouling are generally a concern for the processes for handling an acrylate, methacrylic acid, or a methacrylate monomer. A sulfuric acid-containing waste stream often carries the polymer. Reducing or preventing the operation problems and disposing of the waste stream are challenging and costly goals.

A method for removing these polymer agglomerates or deposits once they form and for preventing agglomeration or deposition of the polymers before they are formed is a need for the process.

SUMMARY OF THE INVENTION

One aspect of the invention is a method of dispersing or dissolving a hydrocarbon foulant in a process fluid in contact with processing equipment for preparation of an acrylate, methacrylic acid, or a methacrylate monomer comprising contacting the foulant with an effective amount of an organic solvent, the organic solvent comprising an alkyl phthalate, an alkaryl phthalate, an aryl phthalate, a phthalic acid, or a combination thereof.

Another aspect is a composition comprising aqueous sulfuric acid, an organic solvent, and a polymer of acrylic acid, an acrylate, methacrylic acid, methacrylamide, or a methacrylate, or a combination thereof, wherein the organic solvent comprises a structure of Formula 1

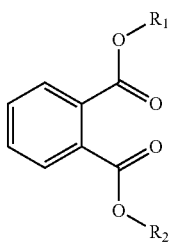

Formula 1 wherein $R_1$ and $R_2$ are independently hydrogen, alkyl, alkaryl, or aryl.

Other objects and features will be in part apparent and in part pointed out hereinafter.

BRIEF DESCRIPTION OF THE DRAWINGS

FIG. 1 is a schematic of the equipment used in a typical methyl methacrylate process.

Corresponding reference characters indicate corresponding parts throughout the drawings.

DESCRIPTION OF THE PREFERRED EMBODIMENTS

The present invention is directed to a method of dispersing or dissolving polymer foulants produced in the process for preparing an acrylate, methacrylic acid, or a methacrylate monomer. Polymers of acrylic acid, an acrylate, methacrylic acid, a methacrylate, a methacrylamide, or other vinyl monomers form as side products. The polymer can become insoluble and then precipitate out of a process stream. The polymer precipitate could deposit on process equipment surface as foulant or agglomerate into large pieces of polymer which can precipitate and separate out of process fluid and adversely affect process operation. The method of the invention disperses or dissolves the insoluble polymer agglomerate in a liquid process stream. Dimethyl phthalate was found to be an effective solvent for polymer agglomerate in a spent acid stream of the methyl methacrylate process. Thus, one advantageous aspect of the method is using a solvent of Formula 1 to reduce or prevent polymer agglomeration or to dissolve an existing polymer agglomerate into a free-flowing liquid and thereby reduce the polymer deposition or fouling of the process equipment.

One aspect of the present invention is directed to a method of dispersing or dissolving hydrocarbon foulants in a process fluid in contact with processing equipment for preparing an acrylate, methacrylic acid, or a methacrylate monomer comprising contacting the foulants with an effective amount of an organic solvent, the organic solvent comprising an alkyl phthalate, an alkaryl phthalate, an aryl phthalate, a phthalic acid, or a combination thereof.

The processing equipment can be for the preparation of methyl methacrylate. Preferably, the processing equipment for preparation of methyl methacrylate is adapted to the acetone cyanohydrin process.

The method described herein wherein the process fluid comprises sulfuric acid or its ammonium salt.

The process fluid can comprise an acrylate, methacrylic acid, or a methacrylate, or a combination thereof. Preferably, the process fluid comprises methyl methacrylic acid, methyl methacrylate, or a combination thereof.

The hydrocarbon foulant can be an oligomer or a polymer of acrylic acid, an acrylate, methacrylic acid, a methacrylate, a methacrylamide, or a combination thereof. Preferably, the hydrocarbon foulant comprises an oligomer or a polymer of methacrylamide, methacrylic acid, methyl methacrylate, or a combination thereof.

The method described herein wherein the organic solvent comprises a structure of Formula 1

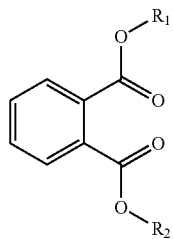

Formula 1 wherein $R_1$ and $R_2$ are independently hydrogen, alkyl, alkaryl, or aryl.

Another aspect of the invention is a composition comprising aqueous sulfuric acid, an organic solvent, and a polymer of acrylic acid, an acrylate, a methacrylate, methacrylic acid, methacrylamide or a combination of thereof, wherein the organic solvent comprises a structure of Formula 1

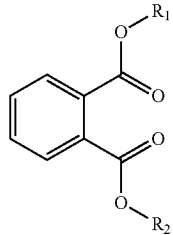

Formula 1 wherein $R_1$ and $R_2$ are independently hydrogen, alkyl, alkaryl, or aryl.

The method or composition wherein $R_1$ and $R_2$ are independently hydrogen and $C_1$-$C_{12}$ alkyl.

The method or composition described herein wherein the organic solvent comprises phthalic acid, monomethyl phthalate, monoethyl phthalate, monononyl phthalate, monododecyl phthalate, monoundecyl phthalate, dimethyl phthalate, diethyl phthalate, dinonyl phthalate, didodecyl phthalate, diundecyl phthalate, monophenyl phthalate, monobenzyl phthalate, diphenyl phthalate, dibenzyl phthalate, or a combination thereof.

The method or composition wherein the organic solvent comprises dimethyl phthalate, diethyl phthalate, dinonyl phthalate, didodecyl phthalate, diundecyl phthalate, or a combination thereof.

The method or composition described herein wherein the organic solvent comprises dinonyl phthalate, didodecyl phthalate, diundecyl phthalate, or a combination thereof.

The method or composition wherein the organic solvent is dimethyl phthalate, diethyl phthalate, or a combination thereof.

The method or composition wherein the organic solvent comprises dimethyl phthalate.

The method wherein the hydrocarbon foulant is an oligomer or polymer of ethylenically unsaturated or vinyl monomers.

The method wherein the hydrocarbon foulant is an oligomer or polymer of acrylic acid, an acrylate, a methacrylate, methacrylic acid, a methacrylamide, or a combination thereof.

The method described herein wherein the organic solvent concentration in the fluid is from about 10 ppm by weight to about 1% by weight.

The method wherein the organic solvent concentration is from about 100 ppm to about 1000 ppm when the organic solvent is used to disperse or prevent hydrocarbon foulant from agglomeration, precipitation, or deposition.

The method described herein wherein the organic solvent is added to the process fluid continuously.

The method wherein the organic solvent concentration is from about 100 ppm by weight to about 15% by weight when the organic solvent is used to dissolve or remove the hydrocarbon foulant.

The method wherein the organic solvent is added to the process fluid intermittently.

The method described herein further comprising a chemical additive, the chemical additive being a second solvent, a dispersant, a polymerization inhibitor, or a combination thereof.

The method described herein where the second solvent comprises, tetrahydrofuran (THF), dimethyl sulfoxide (DMSO), methylene dichloride, or a combination thereof.

The polymerization inhibitor can comprise a phenolic compound, a phenylenediamine or a derivative thereof, a phenothiazine or a derivative thereof, a nitrosophenol or a derivative thereof, a nitroxide or a derivative thereof, a hydroxylamine, or a combination thereof.

FIG. 1 shows the reactor 10, the spent acid stream 30, the spent acid storage tank 50, the spent acid recovery unit 70, and the several places that the organic solvent could be added to the process. In particular, the organic solvent can be added the spent acid storage tank circulation stream 60. Additionally, the organic solvent can be added to the spent acid reactor bottoms stream 30 at injection point 40 in order to treat the stream before it reaches the acid regeneration unit or the spent acid storage tank. Finally, the organic solvent can be added to the reactor inlet 20 or if there is more than one reactor in the system, in between the reactors in order to prevent the agglomeration or deposition of the polymer in the processing system.

The organic solvent can be added to the processing system continuously or intermittently in order to provide a spent acid stream that does not contain a solid polymer that precipitates out of the process fluid or deposits on the equipment. The organic solvent can be added into one or more of the streams in order to maintain a flowing polymer stream within the spent acid stream.

Unless otherwise indicated herein, an "acrylate" is a salt or ester of acrylic acid.

Unless otherwise indicated herein, a methacrylate" is a salt or ester of methacrylic acid.

Having described the invention in detail, it will be apparent that modifications and variations are possible without departing from the scope of the invention defined in the appended claims.

EXAMPLES

The following non-limiting examples are provided to further illustrate the present invention.

Example 1

Dimethyl Phthalate Prevents Polymer from Agglomeration/Precipitation

In a typical methyl methacrylate plant, polymer tends to precipitate out of a spent acid process stream and form solid polymer agglomerate. The polymer agglomerate globules float on the surface of the spent acid stream, and cause operation problems and require cleaning and disposal costs.

The following experiment shows that an organic solvent treatment can prevent the polymer agglomeration or precipitation.

A concentrated polymer solution was prepared by dissolving a piece of solid methyl methacrylate process polymer in a THF solvent. In a test tube with 10 mL of spent acid liquid (an aqueous sulfuric acid waste stream from a methyl methacrylate process), an aliquot of the concentrated polymer solution was added. In an untreated test, upon addition and mixing, the polymer immediately precipitated out of the liquid and turned into a piece of solid polymer floating on the top of the liquid, which was consistent with operational experience. In a treated test, the spent acid liquid sample was dosed with dimethyl phthalate prior to adding the polymer solution. In contrast, agglomeration/precipitation did not occur upon addition of the polymer solution. Instead, the polymer was fully dispersed in the liquid with agitation (after shaking), and then the polymer gradually separated out as a liquid layer at the top of the liquid after settling. The liquid layer was easily redispersed in the spent acid with agitation thereafter. This evidence shows that a dimethyl phthalate treatment was able to keep the polymer from agglomeration or precipitation in an acidic process stream and thus protect process equipment from polymer fouling.

In the above experiment, a large group of candidates were screened. None of them were truly able to prevent polymer precipitation out of the spent acid though some of the organic solvents were able to dissolve the polymer. Dimethyl phthalate was preferred.

Example 2

Dissolution Study

This experiment demonstrated that the organic solvent was also capable of dissolving an existing solid polymer in the spent acid environment. In this experiment, a solid piece of the spent acid storage tank polymer was dropped in a solution of the spent acid and was agitated on a stirrer for 4-6 hours and then left to settle. In a treated sample, dimethyl phthalate was dosed and compared with an untreated sample (not treated with any additives) and a commercial dispersant treated sample.

The solution treated with dimethyl phthalate was much darker than the untreated or the dispersant treated solution, indicating a noticeable dissolution of the polymer into the spent acid solution. In addition, the solid polymer became soft after soaking in the dimethyl phthalate treated solution for two to three days, whereas the other two polymer samples (e.g., the untreated sample and the dispersant treated sample) remained intact. These results showed that dimethyl phthalate was an effective solvent for spent acid storage tank polymer, and was a potential cleaning solvent for removal of a polymer deposited on operation equipment.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description and shown in the accompanying drawings shall be interpreted as illustrative and not in a limiting sense.

What is claimed is:

1. A method of dispersing or dissolving a hydrocarbon foulant in a process fluid in contact with processing equipment for the preparation of an acrylate, methacrylic acid, or a methacrylate monomer comprising contacting the hydrocarbon foulant with an effective amount of an organic solvent comprising an alkyl phthalate, an alkaryl phthalate, an aryl phthalate, a phthalic acid, or a combination thereof, wherein the process fluid comprises a spent acid stream and the organic solvent is added to the process fluid continuously or intermittently whereby the hydrocarbon foulant does not precipitate out of the spent acid stream and the hydrocarbon foulant does not deposit on the processing equipment.

2. The method of claim 1 wherein the processing equipment is for preparation of methacrylic acid or methyl methacrylate.

3. The method of claim 2 wherein the processing equipment for preparation of methacrylic acid or methyl methacrylate is adapted to an acetone cyanohydrin process.

4. The method of claim 1 wherein the process fluid comprises sulfuric acid, an ammonium salt of sulfuric acid, or a combination thereof.

5. The method of claim 4 wherein the process fluid comprises an acrylate, methacrylic acid, a methacrylate, or a combination thereof.

6. The method of claim 5 wherein the process fluid comprises methacrylic acid, methyl methacrylate, or a combination thereof.

7. The method of claim 1 wherein the hydrocarbon foulant comprises an oligomer or a polymer of acrylic acid, methacrylic acid, an acrylate, a methacrylate, a methacrylamide, or a combination thereof.

8. The method of claim 7 wherein the hydrocarbon foulant comprises an oligomer or a polymer of methacrylic acid, methyl methacrylate, methacrylamide, or a combination thereof.

9. The method of claim 1 wherein the organic solvent comprises a structure of Formula 1

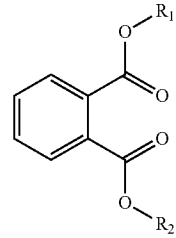

Formula 1 wherein $R_1$ and $R_2$ are independently hydrogen, alkyl, alkaryl, or aryl.

10. The method of claim 9 wherein $R_1$ and $R_2$ are independently hydrogen and $C_1$-$C_{12}$ alkyl.

11. The method of claim 9 wherein the organic solvent comprises phthalic acid, monomethyl phthalate, monoethyl phthalate, monononyl phthalate, monododecyl phthalate, monoundecyl phthalate, dimethyl phthalate, diethyl phthalate, dinonyl phthalate, didodecyl phthalate, diundecyl phthalate, monophenyl phthalate, monobenzyl phthalate, diphenyl phthalate, dibenzyl phthalate, or a combination thereof.

12. The method of claim 11 wherein the organic solvent comprises dimethyl phthalate, diethyl phthalate, dinonyl phthalate, didodecyl phthalate, diundecyl phthalate, or a combination thereof.

13. The method of claim 11 wherein the organic solvent comprises dinonyl phthalate, didodecyl phthalate, diundecyl phthalate, or a combination thereof.

14. The method of claim 11 wherein the organic solvent is dimethyl phthalate, diethyl phthalate, or a combination thereof.

15. The method of claim 11 wherein the organic solvent comprises dimethyl phthalate.

16. The method of claim 1 wherein the organic solvent concentration in the process fluid is from about 10 ppm by weight to about 1% by weight of the process fluid.

17. The method of claim 16 wherein the organic solvent concentration is from about 100 ppm to about 1000 ppm.

18. The method of claim 1 wherein the organic solvent is added to the process fluid continuously.

19. The method of claim 1 wherein the organic solvent is added to the process fluid intermittently.

* * * * *